Patented Oct. 11, 1938

2,132,969

UNITED STATES PATENT OFFICE 2,132,969

CELLULAR PLASTIC MATERIAL AND METHOD OF MAKING THE SAME

Justin L. Rau, Kirkwood, Mo.

No Drawing. Application September 8, 1936, Serial No. 99,818

5 Claims. (Cl. 91—70)

This invention relates in general to plastic materials and, more particularly, to a certain new and useful athermanous and sound-deadening plastic material and to the method of making the same.

My invention has for its primary object and resides in the provision of a plastic material having a highly cellular rigid internal structure and uniquely characterized in possessing exceptional athermanous and sound-deadening properties.

My invention has for another object the provision of a method for preparing, compounding, and treating plastic materials which may be processed either by initial application to a surface and subsequent treatment, or by direct treatment, for ultimately producing therefrom an athermanous and sound-deadening composition having a rigid cellular internal structure.

My invention has for an additional object the provision of an athermanous and sound-deadening substance having a highly cellular internal structure, the cellular or interstitial spaces of which are filled with a relatively athermanous and sound-deadening substance.

Broadly, my invention contemplates the incorporation with or into such materials as asphalts, pitches, resins, or other plastics or mixtures thereof, of predetermined quantities of dry or liquid substances, for present purposes designated leavening agents, which will readily dissociate, decompose, or volatilize, and thereby generate gases or gaseous products, approximately at the softening temperature of the particular plastic or mixture, then heat-treating the mixture to effect liberation of the gaseous products from the incorporated leavening agent, and then subsequently cooling the mixture or material, the resulting product being a structurally strong and rigid mass having a cellular internal structure characterized by possessing high thermal insulating and sound-deadening properties.

I have discovered that a number of asphalts, pitches, resins, and other plastics taken separately and in various combinations, as will presently be more fully set forth in Table I, when mixed with any one of a number of suitable volatile solvents or diluents, such as light petroleum naphthas, oleum, gasoline, benzene, carbon tetrachloride, and straight-chain hydrocarbon solvents generally, form a stiff plastic mass or paste which may be painted, sprayed, troweled, or otherwise spread upon a predetermined surface, which, when allowed to harden, provides a rigid coating, which will again become soft and plastic upon the application of heat. Hence, I may add to any one of such plastic substances or mixtures, which may be termed base materials, a suitable quantity of a selected diluent, forming thereby the plastic or pasty mass mentioned, it being obvious that by the proper selection of base materials and diluents I may produce a plastic mass of any desired viscosity.

To such plastic mass, I add and thoroughly intermix a predetermined quantity of a leavening agent selected with reference to its decomposition temperature, as will presently be more fully discussed in connection with Table II. The resulting mixture may then be applied to the surface to be treated, or may, if desired, be formed into blocks or sheets of desired shape and thickness, after which it is allowed to dry at ordinary temperatures, thereby evaporating off the volatile solvent or diluent, leaving a consolidated mass.

The consolidated mass is then heated to a predetermined or selected temperature, whereupon the leavening agent will decompose, volatilize, dissociate, or otherwise break down and give off gaseous products. Since the leavening agent is dispersed throughout the mass in very finely divided discrete particle form, tiny bubbles of gas will be formed substantially throughout the entire mass. Simultaneously, as the result of the application of heat, the base material will become soft and viscous, so that the gaseous products formed substantially throughout the mass will be relatively free to expand, thereby causing the plastic material to "rise" or leaven.

As soon as the leavening action is complete, the mass may be cooled, whereupon the base material will immediately begin to harden and solidify about the gas bubbles, resulting when finally cooled in a structure having a highly cellular internal conformation.

It is, of course, evident that all of the base materials utilized in the present invention will become increasingly soft or fluid as the temperature is increased. Furthermore, if the base material is too soft at the temperature at which the leavening agent acts, which may be referred to as the "re-action" temperature, then the gaseous products produced thereby will freely bubble through the mass and pass off. On the other hand, if the base material is not sufficiently soft or fluid at the re-action temperature, then the gaseous products will be more or less confined and prevented from properly expanding in the formation of bubbles or cellular spaces throughout the mass. Consequently, it is desirable to select the base material and the leavening agent with reference to re-action temperature, so that the base material will have the proper fluidity during the range of temperatures at which the leavening agent re-acts to produce the "rising" or leavening action. Accordingly, I have experimented with and studied a large number of base materials with reference to their respective fluidity-temperature gradients in order to determine for each such base material the optimum temperature range in which the leavening action may take place, the results being set forth, as Table I, as follows—

TABLE I
Base materials

| Material | Optimum temperature range for leavening | Relative hardness |
|---|---|---|
| | °F. | |
| Gilsonite | 250-350 | Hard (0-3 Pen.). |
| Gilsonite and Mexican (20-30%) | 200-250 | Hard. |
| Gilsonite and drying oils (10-20%) | 200-250 | Hard. |
| Hard blown asphalts | 250-300 | Soft (10-20 Pen.). |
| Hard blown asphalt and gilsonite | 250-300 | Medium. |
| Blown asphalt and fatty acid pitch and gilsonite | 200 | Soft rubbery. |
| Fatty acid pitch | 180-220 | Hard to medium. |
| Gilsonite and fatty acid pitch | 200-250 | Hard. |
| Grahamite 60% and residual oils 40% (Mid-Continent) | 275-300 | Soft (10-20 Pen.). |
| Cracked wurtzilite | 180-300 | Soft (5-15 Pen.). |
| Hard sludge asphalt | 200 | Hard to medium. |
| Hard rosin pitch | 200 | Medium. |
| Coke oven Water gas Oil gas } Pitch | 180-275 | Hard—medium. |
| Blown Mid-Continent and gilsonite | 300-350 | Medium to hard. |
| Hard coal tar pitch and fatty acid pitch | 180-250 | Medium. |
| High melting point residual asphalt | 200 | Medium to hard. |
| Hard gilsonite and residual oil (10-20%) | 200-250 | Hard. |

Similarly, I have experimented with and studied a large number of leavening agents with reference to their respective so-called "re-action" temperature, in order to determine the selection of a particular leavening agent which will become active in a temperature range, at which the selected base material reaches the optimum state of fluidity, the results being set forth, as Table II, as follows—

The leavening agents may be classified as those working in three ways, namely—
(1) Those which, under the influence of heat, dissociate or decompose with resulting generation of gaseous products;
(2) Those hydrated salts which, under the influence of heat, give up their water of hydration in the form of vapor, capable of causing a leavening action in the mass; and
(3) Those substances with sufficient vapor pressure of their own to cause a leavening action under the influence of heat.

The most effective agent in the first group is ammonium carbonate, which decomposes at 180° F. in the following manner $$(NH_4)_2CO_3 \rightarrow CO_2 + 2NH_3 + H_2O$$

producing four volumes of gas, 2.5 to 10% of this material being required depending on the expansion desired.

Urea decomposes at a litle above its melt point, especially in the presence of water, in which case, the decomposition is the same as that above. The addition of salts which lose their water of hydration at about the melt point of the urea greatly increases the effectiveness of this material. Ammonium alum, aluminum sulfate, or calcium sulfate may be used for such purpose. Concentrations of 10% or less are effected in conjunction with moisture producing salts.

Among those salts which produce a leavening action through giving up as a vapor their waters of hydration, is aluminum sulfate $$Al_2(SO_4)_3 \cdot 18H_2O$$

This material starts its leavening action at about 220° F., producing large bubble size, with effective concentrations of from 5-20%.

Ammonium alum, $Al_2(NH_4)_2(SO_4)_4 \cdot 24H_2O$, is not quite so effective, but produces a mass of much finer bubbles. This material yields up 20 molecules of water at about 250° F. Concentrations of 10-20% are effective.

Gypsum, $CaSO_4 \cdot 2H_2O$, is quite effective for higher melt point materials. It causes a leavening action of fine bubble size starting at 260° F. Concentrations of 20-40% are effective.

TABLE II
Leavening agents

| Leavening material | Gaseous products | Temp. | Vol. gas per mol. | Gms. material per vol. gas liberated | Range of concentration |
|---|---|---|---|---|---|
| | | °F. | | | Per cent |
| Ammonium carbonate | $-NH_3$ $-CO_2$ $-2H_2O$ | 185 to 212 | 3 5 | 38.2 20.9 | 2.5-10 |
| Ammonium alum | $-20H_2O$ $-24H_2O$ | 248 392 | 20 24 | 45.4 37.7 | 10-30 |
| Aluminum sulfate | $-18H_2O$ | 212 | 18 | 37 | 5-20 |
| Magnesium sulfate | $-7H_2O$ | 212 | 7 | 36.5 | 10-30 |
| Calcium sulfate | $-1\frac{1}{2} H_2O$ 128° C. | 202 | 1½ | 114 | 10-50 |
| Urea | Decomposes | 270 | | | 10-30 |
| Urea 60 parts, gypsum 114 parts | $-CO_2$ $-2NH_3$ $-2H_2O$ | 270 | 3 | 58 | 10-40 |
| Urea 60 parts, ammonium alum 46 parts | | 220 to 270 | 3 | 35 | 10-20 |
| Urea 60 parts, aluminum sulfate 35 parts | | 220 to 270 | 3 | 31.5 | 10-20 |
| Paraformaldehyde | | 250 | Sublimes | | 2.5-15 |
| Potassium alum | $-18H_2O$ | 235 | 18 | 52.7 | 2.5-20 |
| Tri-basic sodium phosphate | $-11H_2O$ | 230 | 11 | 34.6 | 5-20 |
| Cupric sulfate (hydrated) | $-4H_2O$ | 240 | 4 | 62.4 | 5-20 |
| Cupric chloride (hydrated) | $-2H_2O$ | 240 | 2 | 67.2 | 5-20 |
| Sodium citrate | $-11H_2O$ | 320 | 11 | 64.9 | 5-20 |

Magnesium sulfate, $MgSO_4 \cdot 7H_2O$ (epsom salts), produces a fine grained bubble structure at 220° F. in concentrations of 10% or more. Another very effective agent is hydrated sodium carbonate, $Na_2CO \cdot 10H_2O$.

I have also discovered, as a part of the present invention, that the average size of the bubbles or cellular spaces in the finished product may be varied and fairly accurately controlled. In this connection, it will be apparent that over the temperature range in which a selected base material has an operable degree of fluidity, the average size of the bubble or space formed by the particles of leavening agent will depend, to some extent, upon the fluidity of the mass. In other words, at the lower limits of the range, the base material will be relatively less fluid, and, therefore, the bubble size will be comparatively smaller than at the upper limits of the range, so that, if the cooling of the entire mass is started at a selected point in this temperature range, the bubble size will be correspondingly larger or smaller. The greater factors, however, in controlling bubble size are the particle size of the dispersed leavening agent and the amount of gaseous products given off by the leavening agent during the "rising" or leavening re-action. Accordingly, it has been discovered that, if the selected leavening agent is one which gives off a relatively large volume of gaseous products, the bubble size in the finished product will be correspondingly large. Similarly, if the leavening agent is one which gives off a relatively small volume of gaseous products, the bubble size in the finished product will be relatively small. I have further discovered that, if the leavening agent is pulverized or comminuted to a comparatively fine state of subdivision prior to admixture with the base material, the bubble size in the finished product will be correspondingly small. On the other hand, if the leavening agent is utilized in a comparatively larger state of subdivision, a correspondingly larger bubble size will be achieved in the resulting finished product.

I have also discovered, as a part of the present invention, that the occurring amount of leavening action or rising may be varied and fairly accurately controlled. In this connection, it should be pointed out that it may be desired to provide a finished product in which the layer of plastic, athermanous material has a predetermined thickness. Hence, the percentage rise which a selected leavening agent will impart to a selected base material should be known in advance. For instance, if the thickness of the layer of material prior to leavening or "rising" is 1 cm. and the desired thickness of the finished layer must be 3 cm., then the amount of leavening or rising action may be referred to as 300% "rise". This percentage rise has been found to be a function of the amount of leavening agent employed in the original mix. Thus, if a relatively large quantity of leavening agent is used, a correspondingly large percentage "rise" results.

The following table, showing the variations in percentage "rise" for variations in percentage of leavening agent used, has been compiled from a series of batches utilizing ammonium carbonate as the leavening agent, maintaining constant such factors as the base material, temperature range, and particle size of the leavening agent, varying only the percentages of leavening agent as indicated.

TABLE III

*Percentage rise using ammonium carbonate*

| Percent ammonium carbonate | Percentage rise |
|---|---|
| 0 | 0 |
| 1 | 160 |
| 2 | 310 |
| 3 | 520 |
| 4 | 680 |
| 5 | 810 |
| 6 | 920 |
| 7 | 1,020 |
| 8 | 1,110 |
| 9 | 1,150 |
| 10 | 1,180 |

The above tabular results may be charted or graphed and intermediate figures thus determined, but since the percentage rise is practically a "straight-line" function of the percentage leavening agent, the intermediate figures may be determined by interpolation with sufficient accuracy for most commercial purposes. Similarly, such tabulations or graphs may be made for almost any selected ingredients, so that, once a particular set of ingredients has been chosen to suit a particular use, the "rise" curve can be worked out very easily and readily.

As I have pointed out, the base materials which may be used according to my present invention include not only asphalts, pitches, and resins and combinations of such substances, but also a wide variety of synthetic plastics. Furthermore, I have discovered in this connection that a very useful and interesting series of finished products may be prepared in accordance with the present invention by the utilization of polymerizable resins and similar substances separately and in combination with asphalts and pitches as base materials.

The polymerizable resins referred to have the property of becoming fluid under the influence of heat below a certain temperature which may be termed the polymerization temperature. At or above the polymerization temperature, such resins become hard and develop high structural strength. Hence, I may select a suitable leavening agent, the re-action temperature of which corresponds to the polymerization temperature of the selected resin. When such selected leavening agent is intermixed with the selected resin and the mixture heated to the polymerization temperature, the mixture becomes initially fluid or plastic and the gaseous products given off by the leavening agent effect the leavening or rising action throughout the mass. Simultaneously, however, the polymerization re-action sets in and the mass begins to solidify or harden around the bubbles or cellular spaces thus formed. When the respective re-actions are complete, the mass may be cooled and the finished product utilized in any desired manner.

Finished products formed from base materials including a combination of polymerizable resins and asphalts or pitches have been found to have high structural strength and toughness. Further, some pure asphaltic base materials do not solidify quickly when cooled after the leavening action has been completed, so that some small amount of "falling" or shrinkage may occur, due to the fact that the gas in the bubbles will tend to contract as the temperature decreases.

In many industrial uses, this factor is of little consequence, and in most cases it is normally possible to select a more rapidly solidifying base material when such shrinkage must be avoided. If, however, it is necessary to use a base material which evidences an undesirable amount of shrinkage, then a quantity of a polymerizable resin may be incorporated in the base material, thereby eliminating shrinkage, due to the fact that it polymerizes at the leavening temperature and imparts structural strength to the inter-cellular walls of the mass before cooling takes place. I have also discovered that oxidizable and polymerizable oils, such as linseed, tung, and China-wood oil, may be similarly used as a substitute for or in combination with polymerizable resins, in the manner described.

The use of polymerizable resins, as above described, has a very interesting application in the production of a mass, the cellular spaces of which are in effect partial vacua. If a leavening agent of the water of hydration type is incorporated with a base material of the polymerizable type and the mass heated, the bubble-forming gas given off will be water vapor or steam. As the reaction temperature is reached, polymerization will set in and the mass will acquire structural strength. The mass may then be quickly cooled, whereupon the water vapor will tend to condense, thus forming a finished product in which the pressure in the cellular spaces will only be equal to the so-called partial pressure of water vapor at the temperature to which the finished product is exposed. A similar result may be achieved by utilizing a leavening agent which produces a bubble-forming gas that either reacts with, or is absorbed in, one or more of the base material constituents after solidification has occurred.

It should be noted that the tables previously set forth and the particular materials and combinations discussed are by no means exclusive and are, rather, intended to be illustrative. Similarly, for the purpose of further illustration, the following specific examples or formulae may be referred to.

Example A

| | Parts by weight |
|---|---|
| High melt point gilsonite | 8 |
| Linseed oil | 1 |
| V. M. & P. naphtha, Q. S. to make a cut back of troweling consistency | |

Powdered ammonium sulfate (50 mesh or finer) 5–20% of the whole, depending on the degree of rise required.

Example B

| | Parts by weight |
|---|---|
| High melt point gilsonite | 10 |
| Mexican asphalt | 2 |
| Oleum naphtha | 1 |
| V. M. & P. naphtha, Q. S. | |

Ammonium carbonate (50 mesh), 2.5 to 10% of the whole.

Example C

| | Parts by weight |
|---|---|
| Hard stearin pitch | 8½ |
| Medium stearin pitch | 1½ |
| V. M. & P. naphtha, Q. S. (to make a somewhat thinner cut back) to which is added | |
| Powdered polymerizing phenolformaldehyde resin (bakelite) 25% | |

Ammonium alum (powdered—50 mesh), 15% of the whole.

Example D

| | Parts by weight |
|---|---|
| Lewisol resin | 8 |
| Plioform resin | 2 |
| Castor oil | 2 |
| Solvent naphtha, Q. S. | |

Ammonium carbonate, 10% of the whole.

Example E

| | Parts by weight |
|---|---|
| Gum rosin | 16 |
| Linseed oil | 2 |
| Wood flour | 6 |
| Solvent naphtha, Q. S. | |

Ammonium carbonate, 4–8%.

Example F

| | Parts by weight |
|---|---|
| Mexican asphalt | 1 |
| Gilsonite | 3 |

Heat until fluid and thoroughly intermixed.

Add ammonium carbonate, 0–12%.
Allow to froth up and pour while frothing.

These formulations are typical, and, as has been previously pointed out, other asphalts and asphalt-like materials of similar physical properties may be substituted, as well as other combinations of leavening agents, solvents, hardening agents, and the like.

Cellular athermanous materials prepared in accordance with the present invention need not be produced in layers, but may also be produced in volume and poured in fluid form to fill a large volume of space. This may best be done by selecting a leavening agent, the decomposition temperature of which is below the softening temperature of the selected asphalt. The asphalt is melted and a sufficient quantity of the leavening agent added, whereupon the mass will froth up or leaven. The resulting material may then be poured best to fill a desired space or cavity.

It will be readily understood that the selection of various ingredients in view of the factors discussed will be largely governed by the type of industrial application or use to be made of the present invention. This may be illustrated by reference to some particular commercial operations or uses to which the product of the present invention is peculiarly well suited.

In the manufacture of automobile bodies, it has been found desirable to treat the body panels to render them somewhat athermanous and sound-deadening. It is also customary to apply a baked-on enamel base to the exterior surface of the panel for ultimately receiving the laquer paint or other type of surface finish. Hence, it may be desirable to utilize the heat of the enamel baking operation to simultaneously carry out the leavening process of the athermanous and sound-deadening layer applied to the inner surface of the panel in accordance with the present invention. In such a case, the base material would necessarily be selected with reference to the temperatures utilized in the paint-baking ovens. Once the base material is selected, a suitable leavening agent may be chosen and the mixture prepared with a suitable solvent or diluent as above described. The prepared mixture may then be brushed or troweled on the interior surface of the automobile body panel and allowed to dry. Subsequently, when the body panel is heated in the paint-baking oven, the leavening action will occur in the layer of plastic material applied to the interior surface, so that, when the body panel is removed from the paint-baking oven and allowed to cool, it will be provided with a smooth tightly-adhering layer of athermanous, sound-deadening material of my invention.

Similarly, in the preparation of the interior surfaces of the panels of refrigerator boxes, it may become necessary to utilize an athermanous and sound-deadening layer of precise thickness to allow for the insertion of additional insulating material, or to permit interfitting assembly of the panels. In such case, the base materials and leavening agent or agents may be primarily selected and the percentage "rise" determined for the mixture, whereupon the exact thickness of initial or "un-raised" layer, which must be applied in order to obtain, in the finished product, a layer of the desired thickness, may be accurately determined.

In some industrial uses of my new product, it may be either desirable or necessary that the layer of athermanous material thus prepared have a smooth finished surface texture, in which case a base material should be selected which has a comparatively substantial surface tension at the re-action temperature, so that the tendency of the bubbles to break through the surface will be substantially overcome. In this connection, it will be apparent that the texture of the finished surface, to some extent at least, is dependent upon the bubble size, previously discussed. On the other hand, if a very rough and pitted surface texture is desired in the finished or applied product, then a base material should be selected, the surface tension of which is relatively low at the re-action temperature, utilizing at the same time a combination of base material and leavening agent which will result in a relatively large bubble size.

By my present invention, therefore, I provide a new and unique form of athermanous and sound-deadening material, which may be utilized in a wide variety of industrial and commercial fields, such as building-wall construction, automobile body manufacture, ice-box and refrigeration machinery insulation, as well as also for producing molded plastics of much reduced density and cost. Further, the leavening agents produce bubble-forming gases, such as carbon-dioxide, nitrogen, water vapor, and the like, all of which gases have a co-efficient of thermal conductivity appreciably lower than that of air; consequently, athermanous layers and substances produced in accordance with the present invention are of far greater efficiency than other cellular bodies heretofore available, so far as I am aware, in which the interstitial or cellular space is filled with air.

It is to be understood that changes and modifications in the form, arrangement, proportions, and combination of the several substances and methods may be made and substituted for those herein set forth and described without departing from the nature and principle of my invention.

Having thus described my invention, what I claim and desire to secure by Letters Patent is—

1. The method of providing a surface with an athermanous insulating layer of a cellular substance consisting of dissolving an asphaltic material in a vaporizable solvent, adding thereto a predetermined quantity of a leavening agent of the class consisting of ammonium carbonate, urea, sodium carbonate, and magnesium sulfate, applying the resulting mixture to the surface as a uniform coating, allowing the coating to dry, heating the coating at atmospheric pressure to a temperature range at which the leavening agent gives off gaseous products, and then subsequently cooling the resulting mass at atmospheric pressure.

2. The method of making a cellular substance from a plastic asphaltic material which comprises dissolving, in a compatible solvent, an asphaltic material which has the property of reaching a predetermined degree of viscosity at a predetermined temperature, adding thereto a leavening agent capable of decomposing at said predetermined temperature to produce gas in sufficient volume to exert an expansive force approximately equal to but not substantially greater than the counter-acting force inherent in the asphaltic material at the predetermined degree of viscosity for substantially preventing escape of the gas, heating the mixture at atmospheric pressure to the predetermined temperature, maintaining the mixture at such temperature and at atmospheric pressure until the leavening agent has substantially completed gas-emitting decomposition, and then cooling the resulting mass at atmospheric pressure.

3. The method of making a cellular substance from a plastic asphaltic material comprising, dissolving in a compatible solvent an asphaltic material which has the property of reaching a predetermined degree of viscosity at a predetermined temperature, finely subdividing to a predetermined size a predetermined quantity of a leavening agent of the class consisting of ammonium carbonate, urea, sodium carbonate and magnesium sulphate, which leavening agent is capable of decomposing at said predetermined temperature to produce gas in sufficient volume to exert an expansive force approximately equal to but not substantially greater than the counter-acting force inherent in the asphaltic material at the predetermined degree of viscosity for substantially preventing escape of the gas, adding such predetermined quantity of such leavening agent to the dissolved plastic, drying the mixture, heating the resulting dried mixture at atmospheric pressure to the said predetermined temperature, maintaining the mixture at such predetermined temperature for permitting the leavening agent to form gas bubbles throughout the mass of asphaltic material, and then subsequently cooling the resulting mass.

4. The method of making a cellular substance of a plastic asphaltic material which comprises, dispersing with substantial uniformity throughout the mass of the asphaltic material a leavening agent, said asphaltic material having the property of reaching a predetermined viscosity at a predetermined temperature and said leavening agent having the property of decomposing at said predetermined temperature to produce gas in sufficient volume to exert an expansive force approximately equal to but not substantially greater than the counter-acting force inherent in the asphaltic material at the predetermined degree of viscosity for preventing escape of the gas, heating the mixture at atmospheric pressure to the predetermined temperature, maintaining the mixture at such temperature and at atmospheric pressure until the leavening agent has substantially completed gas-emitting decomposition, and then subsequently cooling the resulting mass.

5. The method of providing a surface with an athermanous insulating layer of a cellular substance consisting of dissolving in a vaporizable solvent an asphaltic material which has the property of reaching a predetermined degree of viscosity at a predetermined temperature, adding thereto a predetermined quantity of a leavening agent of the class consisting of ammonium carbonate, urea, sodium carbonate, and magnesium sulfate, which leavening agent is capable of gasifying at the predetermined temperature to produce gas in sufficient volume to exert an expansive force approximately equal to but not substantially greater than the counter-acting force inherent in the asphaltic material for preventing escape of the gas, applying the resulting mixture to the surface as a uniform coating, allowing the coating to dry, heating the coating at atmospheric pressure to a temperature range at which the leavening agent gives off gaseous products, and then subsequently cooling the resulting mass at atmospheric pressure.

JUSTIN L. RAU.